(12) United States Patent
Roberts et al.

(10) Patent No.: US 11,286,190 B1
(45) Date of Patent: *Mar. 29, 2022

(54) METHOD FOR TREATMENT OF A WASTEWATER STREAM CONTAINING DISSOLVED COMPOUNDS OR IONS

(71) Applicant: Columbia Water Holdings, Inc., Lynnwood, WA (US)

(72) Inventors: Benjamin Roberts, Lynnwood, WA (US); Lee Shull, Lynnwood, WA (US); Michael P. Mehlhoff, Lynnwood, WA (US)

(73) Assignee: Columbia Water Holdings, Inc., Lynnwood, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/850,761

(22) Filed: Apr. 16, 2020

Related U.S. Application Data

(63) Continuation of application No. 14/945,043, filed on Nov. 18, 2015, now Pat. No. 10,669,179.

(Continued)

(51) Int. Cl.
*C02F 1/28* (2006.01)
*C02F 1/36* (2006.01)
(Continued)

(52) U.S. Cl.
CPC ............... *C02F 9/00* (2013.01); *C02F 1/004* (2013.01); *C02F 1/28* (2013.01); *C02F 1/283* (2013.01); *C02F 1/36* (2013.01); *C02F 1/52* (2013.01); *C02F 1/5245* (2013.01); *C02F 1/5263* (2013.01); *C02F 1/78* (2013.01); *C02F 2101/16* (2013.01); *C02F 2101/163* (2013.01); *C02F 2103/10* (2013.01); *C02F 2103/365* (2013.01);
(Continued)

(58) Field of Classification Search
CPC ............ C02F 9/00; C02F 1/5263; C02F 1/36; C02F 2101/16; C02F 2305/00; C02F 1/28; C02F 2103/36; C02F 1/283; C02F 2305/023; C02F 2103/10; C02F 1/52; C02F 1/004; C02F 2101/163; C02F 1/78; C02F 2303/04; C02F 1/5245
See application file for complete search history.

(56) References Cited

U.S. PATENT DOCUMENTS 10,669,179 B2 * 6/2020 Roberts ................. C02F 9/00
2004/0154988 A1 * 8/2004 Sheets, Sr. ............ C02F 11/147
210/718

(Continued)

FOREIGN PATENT DOCUMENTS

EP          2500323 A1 *  9/2012    ............. C02F 1/725

*Primary Examiner* — Matthew O Savage
(74) *Attorney, Agent, or Firm* — John J. Bamert, Esq.; Bamert Regan (57) ABSTRACT

The invention discloses and claims various methods for the treatment of various wastewater streams of varying chemical composition using sonication in combination with a variety of other methods, including nucleation, ozonation, flocculation, clarification, adsorption, polishing, and filtration. The methods disclosed and claimed are useful in the treatment of industrial wastewater, brackish water, seawater, and for the treatment of oil and gas-well water as well as wastewater from hydraulic gas-fracturing processes for the production of oil and natural gas.

37 Claims, 6 Drawing Sheets

Related U.S. Application Data

(60) Provisional application No. 62/082,323, filed on Nov. 20, 2014.

(51) Int. Cl.
  *C02F 1/52* (2006.01)
  *C02F 1/78* (2006.01)
  *C02F 9/00* (2006.01)
  C02F 103/36 (2006.01)
  C02F 1/00 (2006.01)
  C02F 103/10 (2006.01)
  C02F 101/16 (2006.01)

(52) U.S. Cl.
  CPC ...... *C02F 2303/04* (2013.01); *C02F 2305/00* (2013.01); *C02F 2305/023* (2013.01)

(56) References Cited

U.S. PATENT DOCUMENTS

| | | | |
|---|---|---|---|
| 2004/0154991 A1* | 8/2004 | Clark | B01J 19/10 210/748.02 |
| 2008/0061000 A1* | 3/2008 | Janssen | B01J 20/3441 210/663 |
| 2012/0211426 A1* | 8/2012 | Santoro | C02F 9/00 210/665 |
| 2014/0263089 A1* | 9/2014 | Agolli | C02F 1/36 210/748.03 |

\* cited by examiner

METHOD FOR TREATMENT OF A WASTEWATER STREAM CONTAINING DISSOLVED COMPOUNDS OR IONS

PRIORITY CLAIM

This application claims the benefit of U.S. Provisional Application No. 62/082,323, filed Nov. 20, 2014, the contents of which are incorporated herein by reference. This application is a continuation of U.S. application Ser. No. 14/945,043, filed Nov. 18, 2015, which claims the benefit of U.S. Provisional Application No. 62/082,323, filed Nov. 20, 2014.

FIELD OF THE INVENTION

The invention relates to a device and a method for removing unwanted microorganisms and dissolved compounds from liquids utilizing a combination of ultra-sonication and other process steps, in particular sonication in combination with addition of oxidizer(s), adsorbents, and nucleation particles.

BACKGROUND OF THE INVENTION

Many methods for removal of microorganisms and compounds from liquids, and in particular wastewater, are known and practiced. For the purposes herein, the term "wastewater" is meant to encompass all effluent from any industrial, domestic, or other process where the effluent contains a substantial amount of water plus microorganisms and/or dissolved chemicals, organic solids, or inorganic solids. Known methods of treating wastewater are too diverse and numerous to be adequately summarized herein. However, all such methods have limitations related to the specific physical and chemical activity utilized and the liquid stream being treated. Most commercially available methods either require a large and complex apparatus, or are very expensive to purchase and/or to operate, require large amounts of energy, or create large amounts of waste byproducts that are either difficult to handle and/or are very expensive to dispose of.

Certain liquid streams from a range of industrial, agricultural and food processing, and domestic sources are particularly difficult to treat to achieve applicable chemical- and/or biological specific water quality objectives required for discharge, reuse, or further processing. Example chemicals in "industrial" liquid streams includes: various petroleum hydrocarbons that frequently contaminate ambient water (surface and/or groundwater) during oil and gas exploration, production, refining and/or distribution; various petroleum hydrocarbons, inorganic geochemicals and additives in flow back and produced water (frac water) from oil and gas well hydraulic fracturing operations; various inorganic chemicals in wastewater from mining operations; a range of organic and/or inorganic chemicals in wastewaters from various other manufacturing processes. Example chemicals in "agricultural and food processing" liquid streams includes: chemicals inadvertently added to ambient water (surface and groundwater) notably nitrogenous compounds (e.g., nitrate and ammonia) and pesticides from long-term land application; chemicals and/or microorganisms (e.g., coliforms) in animal waste runoff from confined animal facilities (CAFs); hydrocarbons of biological origin in wastewaters from food processing and meat packing facilities. Example chemicals associated with "domestic" liquid streams includes: a wide range of chemicals associated with pharmaceuticals and personal care products (PPCPs) in greywater from publically owned wastewater treatment (POWT) facilities; microorganisms, human waste products, and PPCPs and other chemicals in blackwater (septage) from private septic systems. Such liquid streams are particularly amendable to treatment using aspects of the present invention.

The term "industrial wastewater" as used herein shall include wastewaters and polluted ambient water (surface and groundwater) associated with: petroleum exploration, production, refining and distribution; chemical manufacturing and processing plants; semiconductor and electronics manufacturing; mining operations; other waste streams substantially equivalent to the specifically listed waste streams. The term "agricultural and food processing wastewater" as used herein shall include wastewaters and polluted ambient water (surface and groundwater) associated with confined animal facilities (CAFs) such as dairy, swine, beef, poultry, and aquaculture operations; food processing and production operations, and slaughterhouse and meat packing operations; other waste streams substantially equivalent to these specifically listed waste streams. The term "domestic wastewater" as used herein shall include both greywater (wastewater not containing human waste) and blackwater (wastewater containing human waste); other waste streams substantially equivalent to these specifically listed waste streams.

Removal of salts from brackish water and seawater is currently accomplished through either distillation or reverse osmosis. While these methods are effective, energy requirements and therefore costs are high, preventing widespread use. Methods have been developed to reduce energy costs through use of waste-heat to heat water in distillation or to pretreat water to remove scaling compounds in advance of reverse osmosis treatment. However, alternative methods for removing salts at low energy cost have not been proven effective to date.

There is a need for liquid treatment processes that are capable of removing these difficult dissolved chemicals in a cost-effective manner and that have a broad range of application and use conditions. In addition, the size and complexity of the associated equipment is an important factor in the utility and application of such methods.

The use of oxidizers to sanitize and/or reduce the oxygen demand of domestic, animal, and industrial waste streams is commonplace, with the addition of chlorine the most common method. Biological methods are routinely used to reduce Biological Oxygen Demand ("BOD") and Chemical Oxygen Demand ("COD") from those waste streams. Such systems require induction and maintenance of bacterial growth and separation of large amounts of solid waste.

Sonication of liquids is used most commonly in jewelry and parts cleaning. It is also used to induce or accelerate chemical processes in the chemical and pharmaceutical industries. Sonication methods have not heretofore been applied commercially to wastewater treatment as herein presented and claimed.

The addition of nucleating agents to liquids is commonly used in industrial processes to promote precipitation and crystallization. However, nucleating agents are not commonly used in wastewater treatment, due in part to the relatively low concentration of the target compounds in solution and the low efficiency of the precipitation reaction. Methods for improving nucleation efficiency are needed.

Adsorption processes are commonly used in a wide range of industrial processes and waste treatment applications, including removal and/or concentrating of dissolved compounds. Numerous dissolved compounds are resistant to adsorption, due to the specific ion characteristics and the affinities of known adsorbents. Examples of such compounds are most salts, nitrates, nitrites, ammonia, some metals, inorganic oxides, and some hydrocarbons. Methods for improving adsorption characteristics for refractory compounds are therefore needed.

SUMMARY OF THE INVENTION

The invention includes various methods for the treatment of liquids to remove various dissolved compounds, solids, and microorganisms using sonication in combination with a variety of other methods. Some of the other methods claimed for use with sonication include nucleation, ozonation, flocculation, clarification, adsorption, polishing, and filtration. The methods disclosed and claimed are useful in the treatment of domestic wastewater, industrial wastewater, brackish water, seawater, and for the treatment of oil and gas-well water as well as wastewater from hydraulic gas-fracturing processes for the production of oil and natural gas.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
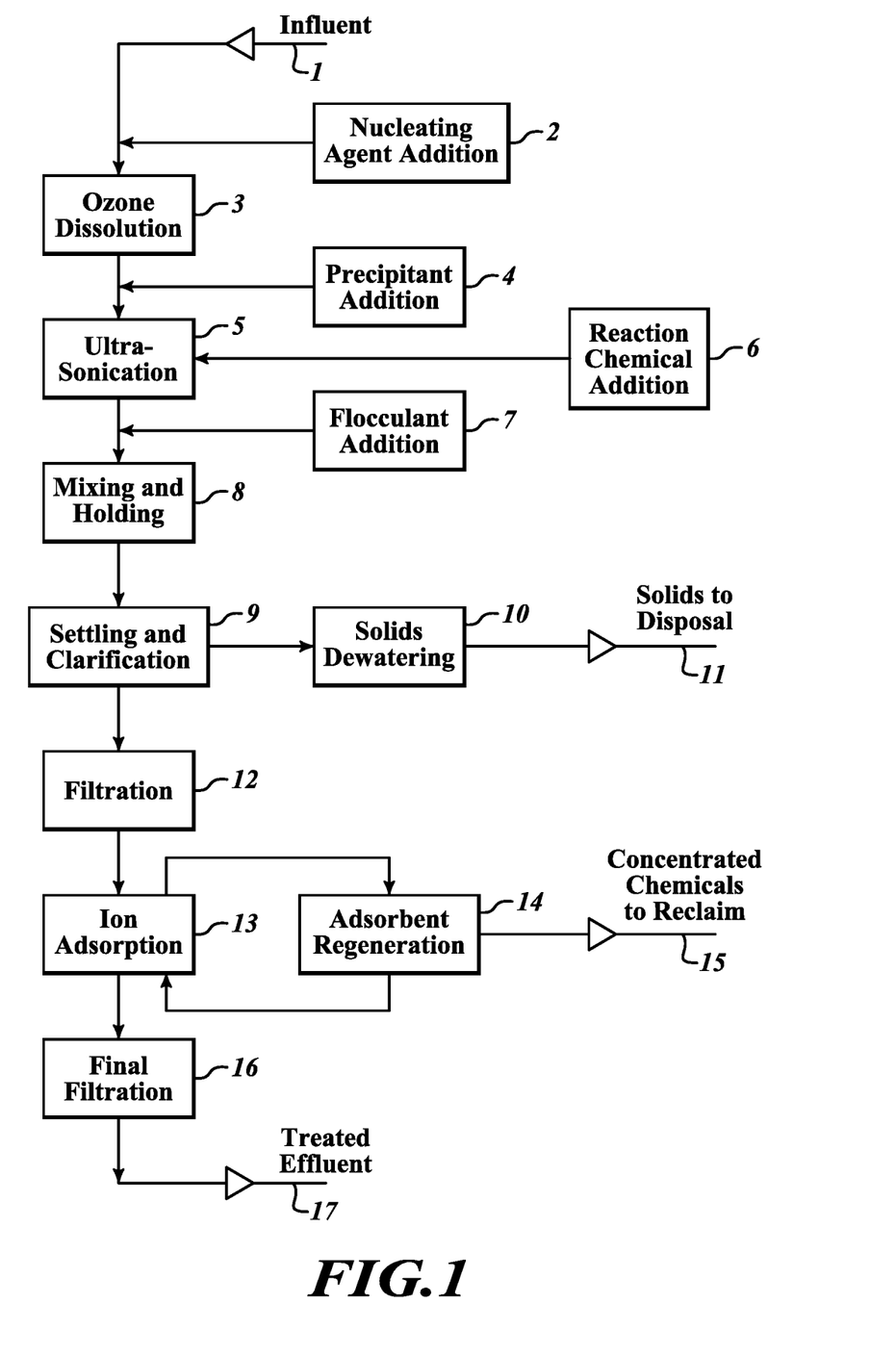
FIG. 1 shows a process flow diagram, including steps that are included in one embodiment of the invention.

FIG. 1 presents an overview of process steps for a preferred embodiment of the invention usable for the treatment of certain liquids, including domestic sewage and oil- or gas-fracturing wastewater. Liquid enters the treatment system as an influent 1 under pressure and is temporarily stored in a balancing tank (not shown). A nucleating agent 2 may be added either to the balancing tank or to the flowing liquid as appropriate; such nucleating agent is preferably flyash, pozzolanic mineral particles, polymer micro-spheres, silica or alumina particles, or calcium particles. One of ordinary skill in the art will appreciate that nucleating agents not specifically mentioned herein are also suitable. The liquid may then be pumped through an ozone dissolution chamber 3 where gas bubbles are dissolved to the extent possible and then residual bubbles removed via flotation.

Maximizing ozone concentration in liquids in accordance with principles of the present invention provides for efficient oxidation while minimizing suspended bubbles, and helps achieve high ultrasonic energy transfer to the liquid being treated. Moreover, the presence of gas bubbles in the liquid during sonication preferably increases the compressibility of the liquid, dampening the pressure fluctuations created by the vibrations of the sonotrode. Gas bubbles are less likely to be created under these conditions and the collapse of gas bubbles (i.e., cavitation) is reduced. The energy released by cavitation is generally reduced in the presence of stable gas bubbles.

The ozone dissolution chamber useable in accordance with the present invention is configured to create a stable suspension of the gas bubbles, whereby the gas bubbles rise slowly through the downward flowing liquid. This is accomplished by controlling the downward water velocity through matching the flow cross section to the liquid flow rate, such that the downward shear on the gas bubbles nearly equals the buoyancy force on the bubbles. A very small portion of the bubbles (the smallest bubbles) are entrained in the flowing liquid, while the majority of the bubbles have an extended residence time, of up to 2 minutes. This extended residence time maximizes the dissolution of the gas, particularly the ozone portion, into the liquid. As explained in greater detail below, a precipitating agent 4 may also be added in liquid form before sonication. The presence of this agent will increase the extraction of dissolved compounds, particularly under the high energy conditions produced in the sonication chamber 5.

Wastewater streams treatable in accordance with the present invention as shown in FIG. 1 is preferably exposed to sonic energy in the sonication chamber 5. The specific conditions of exposure may vary in intensity, duration, sonic frequency, and sonic wave form. A reaction chemical 6 may be injected into the sonication chamber at points where the sonic energy density is maximal to enhance reaction rates and kinetics; such reaction chemical will incorporate at least one of the following: acid, caustic, flocculating agent, precipitating agent, nucleating agent, or sequestering agent.

Those of ordinary skill in the art will appreciate that certain physical and chemical reactions are enhanced by exposure to very intense sonic energy (i.e., above at least 20,000 Hz) and the accompanying cavitation energy. These reactions include: mechanical cleaving of solid particles, abrasion of solid surfaces which exposes newly activated reaction sites, intense mixing, enabling of high temperature reactions, creation of free radicals (e.g.: HO■, O2■), and promoting of reduction and oxidation reactions. Direct injection of reaction chemicals maximizes the chemical concentration in the high sonication energy portion of the chamber, which maximizes the reactions that are promoted by the reaction chemical.

As depicted in FIG. 1, immediately after sonication in the disclosed embodiment, a flocculating agent 7 is preferably added to the liquid stream. The flocculating agent preferably incorporates at least one of the following: aluminum sulfate, aluminum chloride, chito-san, or a natural or synthetic polymer. One of ordinary skill in the art will appreciate that other flocculating agents not specifically listed herein may be used as well. The wastewater stream may then be held in a tank 8 where it is preferably mixed using a mechanical stirrer. The intensity and duration of mixing depends upon the action of the flocculating agent. Intense and prolonged mixing generally prevents the formation of the floc, but an absence of mixing prevents proper dispersion of the agent and may inhibit the flocculation process. In the preferred embodiment the liquid is not held in a tank; mixing is accomplished via an in-line static mixer which briefly shears the liquid as it moves through the mixer. Residence time in the static mixer is brief, typically between 1 and 5 seconds.

The wastewater treated by the embodiment shown in FIG. 1 is preferably further processed through a settling and clarification tank 9 where suspended solids are separated from the liquid stream. The solids form a slurry that is then preferably de-watered 10 via a cyclone or filter press and then sent to disposal 11, which may include reprocessing and reuse. The resulting supernatant liquid may then be filtered 12 to remove remaining suspended solids. The liquid may then flow through one or more ion adsorption beds 13 filled with granular or spherical adsorption media to remove residual, generally low concentration dissolved compounds; such adsorption media will incorporate at least one of the following: zeolites, activated carbons, aluminas, silicas, or polymers. When exhausted, the adsorbent may be regenerated 14 and reused or sent to reclaim 15. As those of skill in the art will appreciate, standard regeneration methods vary with the adsorbent type and the chemical(s) being removed. A final filtration 16 is preferably utilized to remove particles created or mobilized during liquid treatment. The treated effluent 17 from the system then exits the treatment system.

Figure 2:
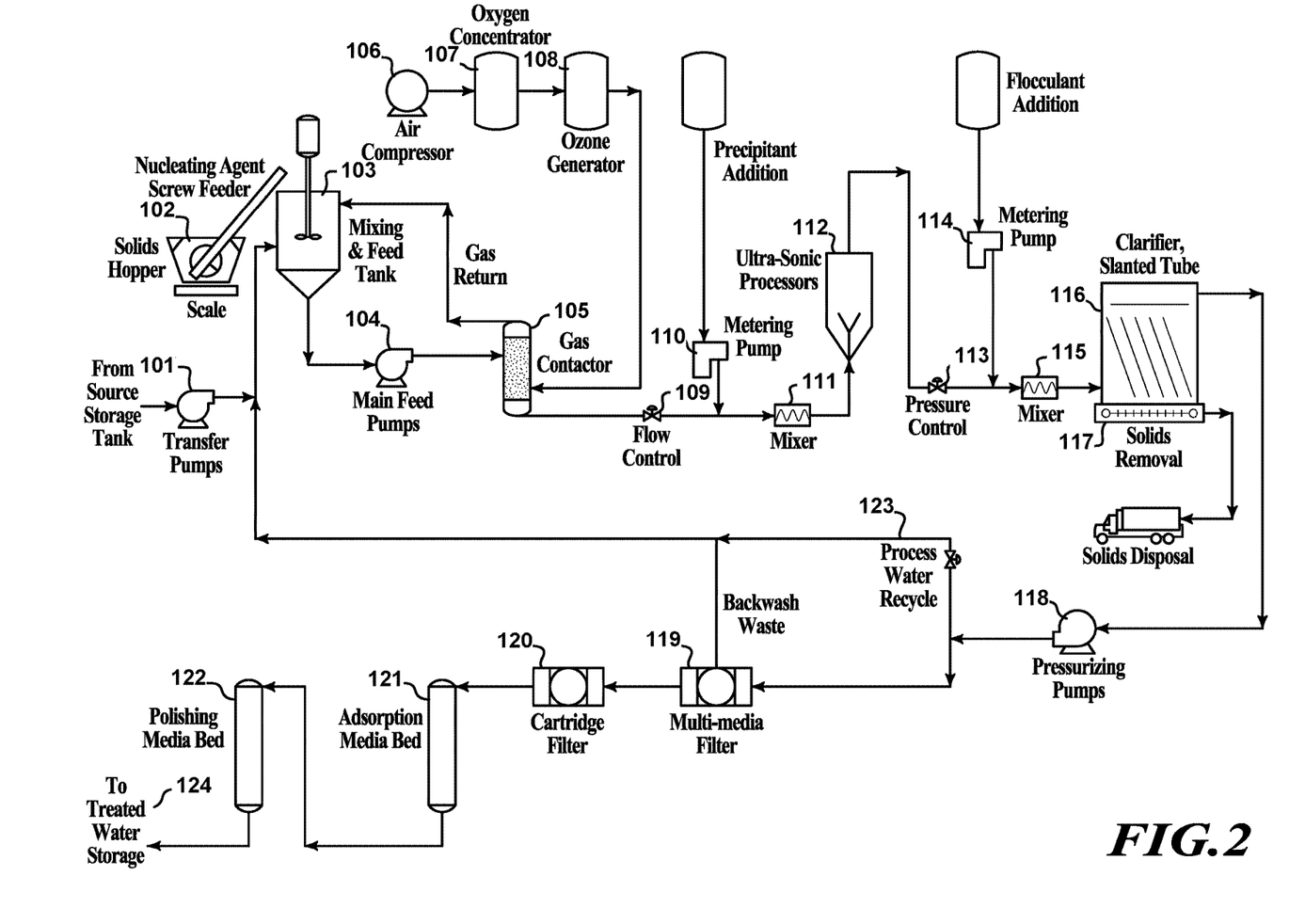
FIG. 2 shows an example system diagram, identifying various process steps and equipment useable in accordance with principles of the present invention.

FIG. 2 presents a schematic diagram of the liquid flow through the treatment system and the equipment used to treat liquids in a preferred embodiment. Liquid to be treated is transferred into the system via transfer pump(s) 101 and enters the mixing and feed tank 103, where mixing is maintained via mechanical stirring. Preferably, a powdered nucleating agent is added via weigh plate, hopper and screw feeder 102. At this point in the preferred embodiment, additional chemicals, such as acids or bases, may be added to the feed tank as needed or required by the treatment objective. The nucleation agent is added when precipitation of a dissolved ion is desired and the agent in combination with sonication will enable or enhance the precipitation reaction. In the preferred embodiment, the nucleation agent is class C fly ash produced by lignite coal combustion. However, other classes of fly ash can also be utilized, as can other nucleating agents such as very fine inorganic crystalline particles. In the preferred embodiment the addition rate for flyash is 500 ppm, however, other addition rates may also be used, such as 50 ppm, 100 ppm and 1000 ppm. The addition of acids or bases may also be used to adjust pH and enhance specific desired reactions. For example, the addition of a caustic can change the form of ammonia ion from aqueous (hydrophilic) to non-aqueous. In the preferred embodiment, no pH adjustment is included, but one of ordinary skill in the art will appreciate that pH adjustment is contemplated as needed. Liquid is fed into the treatment steps via the main feed pump(s) 104 and flows through the gas contactor 105. Flow rate into the system is measured and managed by the flow controller 109. Ozone is generated as a mixture of air and ozone by the air compressor 106, oxygen concentrator 107 and ozone generator 108 and is then added to the gas contactor 105 as fine bubbles. The bubbles are dispersed and the ozone dissolved in the gas contactor 105 via a downward liquid flow and upward gas bubble movement, effectively minimizing entrained gas in the liquid stream leaving the distal end of the gas contactor 105. Undissolved gas returns from the gas contactor 105 to the feed tank 103.

With continuing reference to FIG. 2, liquid flows through the flow controller 109 to the in-line mixer 111 and a precipitating agent may be added via metering pump 110 in advance of the mixer. The precipitating agent is preferably added when one or more dissolved compounds or ions can be removed through a chemical reaction that is enhanced or promoted by the presence of a nucleating agent and/or the enhancement of the precipitation reaction by sonication energy. For example, metal ions such as iron can be precipitated by adding a sulfate, hydroxide or other agents. Dosage of a precipitating agent depends on the concentration of the dissolved ion to be removed and the specific reaction that is promoted. In the preferred embodiment, dosages range from 50 to 500 ppm.

With continuing reference to FIG. 2, liquid preferably flows through the ultra-sonic processor(s) 112. Conditions within the processor(s) 112, including pressure, flow rate, sonic frequency, power, and exposure duration, are controlled to maximize treatment effectiveness for the specific liquid stream and chemical changes desired. In the preferred embodiment, pressure is controlled to 30-40 psi, flow rate for systems no larger than 2000 gallons per day capacity is set within a range of 0.5 to 2 gpm, sonic frequency is preferably set to approximately 20,000 Hz, sonic power is preferably set to approximately 900 watts, and exposure duration is preferably 0.5 to 2.5 seconds. Liquid exiting the processor(s) 112 then flows through the pressure controller 113 and static mixer 115 into the clarifier 116. A flocculating agent may preferably be added via metering pump 114 in advance of the static mixer 115. The addition rate of a flocculating agent will, in the preferred embodiment, be determined by the concentration and characteristics of fine solid particles either present in the liquid to be treated or generated by the nucleating agent and sonication. For example, removal of total dissolved solids from a wastewater stream produced by oil and gas wells preferably requires use of a flocculent at concentrations of 10-100 ppm. In the preferred embodiment, a chitosan based flocculent (GTC Bio model CFOS or equivalent) is added. However, many other forms of chitosan and many other flocculent types have potential applicability.

Suspended solids in the liquid stream settle to the bottom of the clarifier 116, which may consist of a variety of slanted plate, slated tube, and other elements, and are removed by solids removal mechanism 117, which may consist of a screw conveyor or a suction system. The amount of solids present in the liquid being treated will vary with both the characteristics of the liquid and the amount of nucleating agent and flocculating agent added. For example, a liquid containing only nitrates, ammonia and other nitrogenous compounds may contain no solids and require no addition of flocculent. In contrast, a domestic sewage (black-water) liquid may contain 0-10% solids and the addition of nucleating agent and flocculating agent may therefore add less than 0.1% solids. The volume of solids will depend on the amount of water contained in the dewatered material, which in the preferred embodiment will be between 10% and 50%. Residence time in the clarifier depends on the density of the solids and the viscosity of the liquid. In the preferred embodiment, residence time in the clarifier will range from 20 minutes to 100 minutes. Solids are dewatered outside of the system and disposed as appropriate.

Liquid is pumped into the remainder of the treatment system via pressurizing pump(s) 18, with a portion of the partially treated liquid being returned to the feed tank 103 as controlled by the water recycle valve 123. The amount of liquid returned to the feed tank depends on the need for repeated exposure of the liquid to sonication, ozonation, and nucleating agents. In the preferred embodiment, the portion of liquid returned to the feed tank will be between 0% and 66%. For treatment of domestic sewage, for example, 0% may be returned. For nitrate and ammonia removal, for example, 50% may be returned.

With continuing reference to FIG. 2, the remaining liquid preferably flows through one or more multi-media filters 119. Multimedia filters 119 useable in accordance with principles of the invention include those available from Hayward, Model S244T Pro Series high rate media filter or an equivalent. As shown in FIG. 2, the remaining liquid preferably also flows through one or more cartridge filters 120. Cartridge filters usable in accordance with principles of the present invention include those available from Rosedale, i.e., the Platinum 700 Polypropylene filter housing with 5 micron cartridges, or an equivalent. Filtration by the cartridge filter(s) 120 is for removal of any residual suspended solids.

With continuing reference to FIG. 2, the liquid preferably flows through an adsorption media bed 121. The adsorption media bed 121 is preferably configured from a clear polypropylene tubular vertical column containing between 1 and 20 liters of media per liter per minute of flow rate through the column. Adsorption media bed 121 preferably removes dissolved compounds, and then, through a polishing media bed 122, additional dissolved compounds are removed. Polishing media bed 122 is preferably configured from a clear polypropylene tubular vertical column containing between 1 and 20 liters of media per liter per minute of flow rate through the column.

The adsorption media bed 121 and polishing bed 122 may contain one or more of the following media: aluminas, silicas, zeolites, carbons, polymers, or organic fibers. In the preferred embodiment, the adsorption media bed 121 contains a type 5A zeolite (ACS Materials ZSM-5 or equivalent). However, many other types of zeolite and other adsorbents may be used to accomplish the adsorption of dissolved compounds. In the preferred embodiment, the polishing bed 122 contains granular activated carbon produced from coal (General Carbon GC 12×40AW or equivalent). However, many other types of activated carbon or other polishing media may be used to remove odor, color, and residual concentrations of hydrophobic compounds. The fully treated liquid stream then flows to storage 124.

Figure 3:
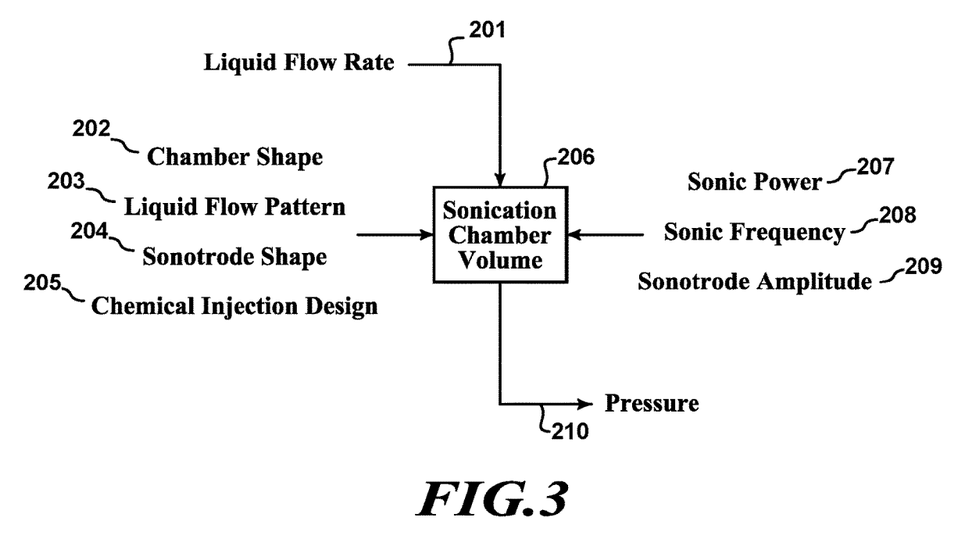
FIG. 3 is a relationship diagram showing factors used to control the application of ultra-sonic energy to the wastewater stream being processed in accordance with principles of the present invention.

FIG. 3 shows the various factors used to control the application of ultra-sonic energy to the liquid stream being processed in accordance with principles of the present invention. As depicted in FIG. 3, a variety of factors may be used in accordance with principles of the present invention for sonication management. In the preferred embodiment, sonic energy dosage is set within the range of 0.1 to 10 watt-hours per liter of liquid treated. One of ordinary skill in the art will appreciate that higher dosage may be required to treat relatively refractory dissolved compounds. Desired results may include but are not limited to: induction of precipitation of dissolved metals and other solids, destruction of bacteria and other microbes, chemical oxidation or reduction of organic molecules, chemical reduction of oxidized ions, pulverization of suspended solids, surface activation of solid adsorbent particles, and polymerization of organic molecules. As shown in FIG. 3, liquid flow rate 201 and chamber volume 206 jointly control exposure time in the sonic energy field. Also shown in FIG. 3, chamber shape 202 and sonotrode shape 204 may jointly induce flow patterns 203 within the sonication field, effecting uniformity of exposure to sonic energy to produce a specific result such as, for example, induction of precipitation of a dissolved metal or other solid.

In the preferred embodiment, as depicted in FIG. 3, at low liquid processing rates, a single sonication chamber with a defined volume 206 is used, with the volume of the chamber 6 and sonotrode shape 4 selected to transfer the required energy to the liquid. Multiple sonotrode collars are preferably used to increase the transfer of energy into the liquid by increasing the area of the moving sonotrode faces.

In the preferred embodiment, each small volume of liquid has nearly the same exposure to sonic energy. Maximum sonic intensities occur in close proximity to the face(s) of the sonotrode, such that residence time in these parts of the chamber is monitored. In the preferred embodiment, the overall residence time of a small parcel of liquid in the sonication chamber is preferably between 0.5 and 10 seconds. Residence time within a high intensity sonic energy field is preferably between 0.2 and 4 seconds. As depicted in FIG. 3, sonication chamber 206 can be fitted with a chemical injection system 205 which enables introduction of liquids directly into the high intensity sonic field(s). As depicted in FIG. 3, sonic power 207 may be adjusted by varying the electrical energy supplied to the sonotrode, while the amplitude of sonotrode movement 209 may also be controlled to create optimal conditions for specific chemical and/or physical reactions in the chamber. Sonic power 207 and sonotrode movement amplitude 209 are controlled by adjusting the electrical wave form generated by the sonic power supply. Lastly, the frequency of sonic energy 208 may be set to achieve specific objectives, including but not limited to maximizing: cavitation, energy transfer to suspended particles, and excitation and/or breaking of chemical bonds. In the preferred embodiment a sonic energy frequency of approximately 20,000 Hz is used. However, sonic energy frequencies between 18,000 and 40,000 Hz may be used.

Figure 4:
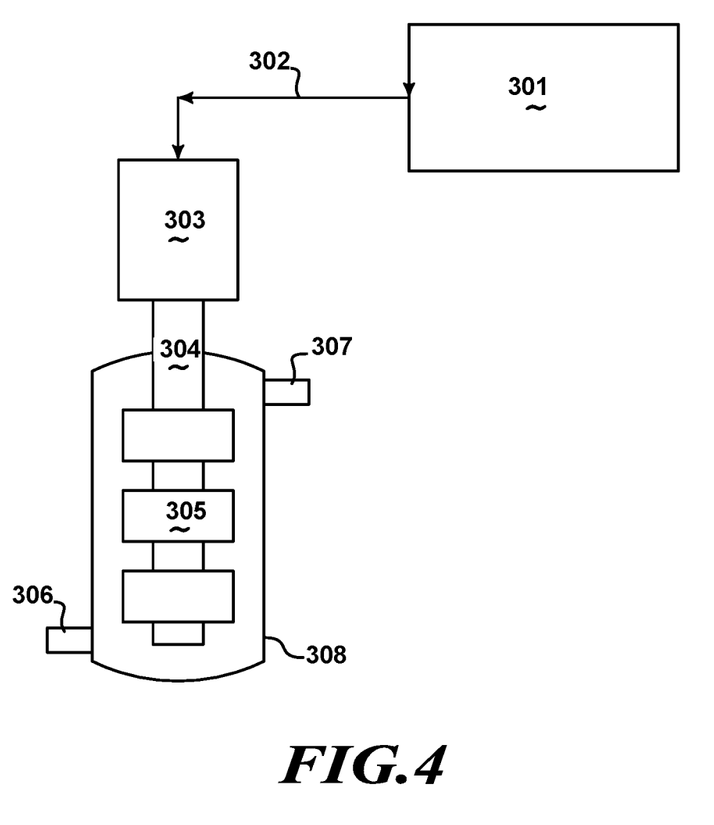
FIG. 4 is a schematic representation of one embodiment for a sonication device (sonotrode) and sonication chamber that may be used in accordance with principles of the present invention.

FIG. 4 shows a schematic representation of the preferred embodiment of a sonication device useable in accordance with principles of the invention. The sonication device consists of an electrical control cabinet 301, electrical connection 302 to the device, the sonic horn 303, the sonotrode shaft 304, the sonotrode shaft collars 305, liquid inlet 306, liquid outlet 307, and the sonication chamber 308. The preferred sonication device is manufactured by Hielscher Ultrasonics, gmbh; however, other manufactured sonication devices will work equally well. The preferred sonication device is designed to treat liquids in a flow-through arrangement and under adjustable flow, pressure, and temperature conditions. The electrical control 301 is a high power oscillator that generates approximately sinusoidal signals with amplitude and frequency desired to obtain specific results and feeds the resultant electrical power to the device via wiring 302. The sonic horn 303 converts the electrical signal into physical motion along the axis of the sonotrode 304. This conversion of electrical energy to mechanical movement is accomplished via piezo-electric devices that change dimensions in response to electrical inputs and accelerate an attached object, such as the sonotrode. The sonotrode 304 vibrates longitudinally in response to motion imposed by the sonic horn 303 and transfers motion to the sonotrode collars 305. The sonotrode assembly has dimensions which increase or reduce the amplitude of the longitudinal motion of the sonotrode collars 305. Increases in sonotrode motion amplitude increases the transfer of energy to the liquid and thereby increases the intensity of the cavitation generated. The movement of the end face of the sonotrode 304 and the transverse faces of the collars 305 displace liquid as they move, accelerating the liquid locally and generating pressure fluctuations. The low pressure portion of the acoustic waves create, due to the inertial response of the water to movement and the incompressibility of the water, a drop in the local pressure to below the vapor pressure of water, causing the formation of gas bubbles. The high pressure portions of the acoustic waves then compress the gas bubbles, causing them to collapse suddenly. The rapid collapse of the bubbles generates pressures in excess of 1000 atmospheres and temperatures in excess of 5000 degrees Kelvin. The bubble collapses and resulting pressure fluctuations are referred to as cavitation. These conditions preferably produce physical alterations and chemical reactions in the exposed liquid wastewater. The liquid to be treated enters the chamber via port 306 and leaves the chamber via port 307. The size, shape and orientation of the ports 306 and 307 are designed to maximize mixing within the chamber and ensure nearly uniform exposure of the liquid to sonic energy and cavitation. The chamber of the preferred embodiment creates a rotating spiral flow which, from the inlet port 306, moves in close proximity to the sonotrode while flowing upward towards the outlet port 307.

Figure 5A:
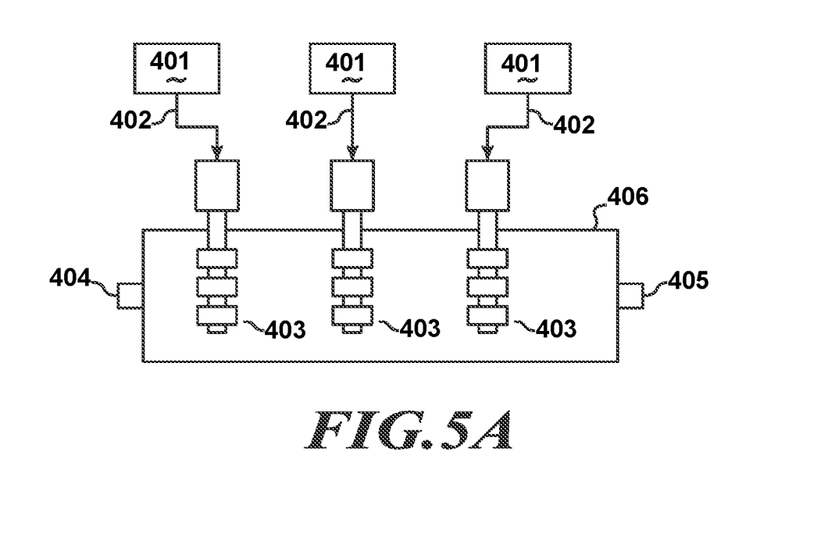
FIG. 5A shows a schematic representation for an embodiment for a sonication device (sonotrode) and sonication chamber that may be used in accordance with principles of the present invention, where the sonication device comprises an assembly incorporating multiple sonotrodes in series configuration.
Figure 5B:
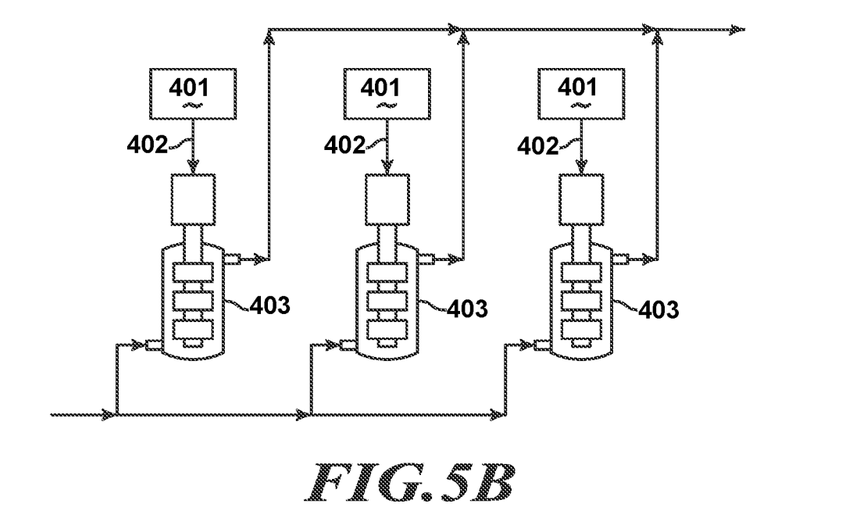
FIG. 5B shows a schematic representation for an embodiment for a sonication device (sonotrode) and sonication chamber that may be used in accordance with principles of the present invention, where the sonication device comprises an assembly incorporating multiple sonotrodes in parallel configuration.

FIGS. 5A and 5B show two preferred designs for utilizing multiple sonication devices in one process. The configuration shown in FIG. 5A utilizes multiple devices in series within a single plenum, while the configuration shown in FIG. 5B utilizes multiple devices with individual chambers where the flow is split between the devices. Individual electrical control cabinets 401 and electrical connections 402 supply power to each sonication device 403. Liquid to be treated enters via port(s) 404 and exits the treatment via port(s) 405. The plenum in the upper drawing can be built in a variety of configurations, including but not limited to: square or round metal tubes, round tanks, and baffled round tanks. Other sonication device configurations may be used in accordance with principles of the present invention, including flat plate sonic radiators, or multiple parallel and opposing flat plate radiators. Any of these configurations can be used in the current apparatus and be useful in applying the current technology.

Figure 6:
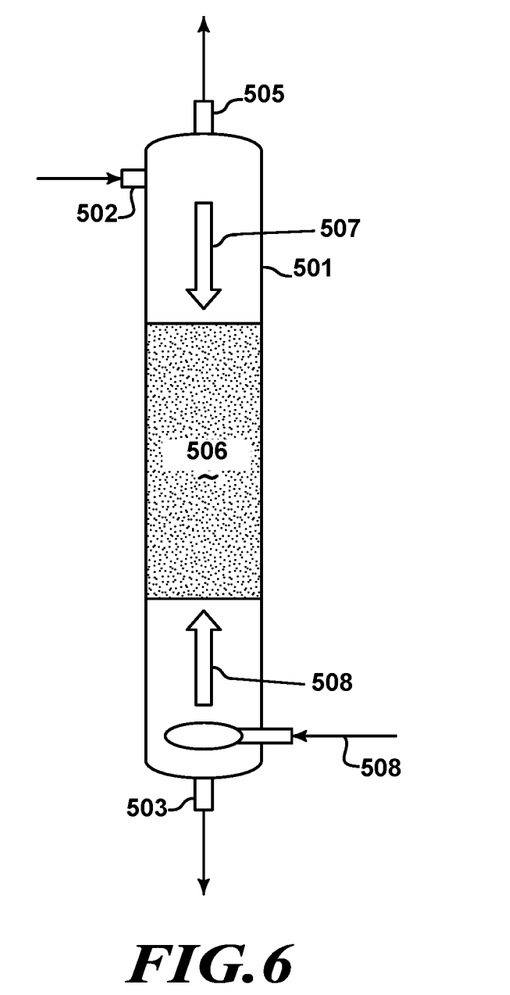
FIG. 6 shows a schematic representation of an ozone dissolution chamber used in accordance with principles of the present invention.

FIG. 6 shows the preferred design of the ozone dissolution chamber, which provides for the dissolution of a gas, in this case ozone, in a flowing liquid stream. The chamber 501 in the preferred embodiment is a plastic tube, preferably clear, whose diameter varies with flow rate, such that downward liquid motion counteracts upward gas bubble migration. Liquid flows into inlet port 502, down the chamber as represented by arrow 507, through the baffle assembly 506, and out through outlet port 503. A gas, in this case ozone, flows in through sparging assembly as represented by arrow 504 which divides the gas into micro-bubbles that then enter the liquid and rise slowly upward as represented by arrow 508. Undissolved gas, predominantly the carrier gas (air in this embodiment), exits the chamber through port 505.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for treatment of a wastewater stream containing dissolved compounds or ions, the method comprising the following steps:
    exposing the wastewater stream to sonic energy by directing flow of said wastewater stream through a sonication device; and
    adding a precipitating agent to the wastewater stream before the wastewater stream is exposed to sonic energy.
2. The method of claim 1, wherein the wastewater to be treated is industrial wastewater.
3. The method of claim 1, wherein the wastewater to be treated is from an oil-well or gas-well.
4. The method of claim 1, wherein the wastewater to be treated is from hydraulic fracturing operations used for the production of oil or gas.
5. The method of claim 1, further comprising adding a flocculating agent to the wastewater stream.
6. The method of claim 5, wherein the flocculating agent is added to the wastewater stream after the wastewater stream has been exposed to sonic energy.
7. The method of claim 5, further comprising mixing the wastewater after adding the flocculating agent.
8. The method of claim 7, wherein mixing the wastewater includes mixing the wastewater with a mechanical stirrer while holding the wastewater in a tank.
9. The method of claim 7, wherein the mechanical stirrer includes an in-line static mixer that shears the wastewater without holding the wastewater in a tank during the mixing.
10. The method of claim 1, further comprising adding an oxidizing agent to the wastewater stream before the wastewater stream is exposed to sonic energy, wherein adding the oxidizing agent to the wastewater stream increases compressibility of the wastewater.
11. The method of claim 10, wherein adding the oxidizing agent to the wastewater stream includes creating a stable suspension of gas bubbles.
12. The method of claim 11, wherein creating the stable suspension of gas bubbles includes controlling a velocity of the wastewater to apply a force on the gas bubbles that provides the stable suspension.
13. The method of claim 1, wherein a reaction chemical is injected into a sonication chamber of the sonication device.
14. The method of claim 13, wherein the reaction chemical is injected into a point in the sonication chamber of the sonication device where sonic energy density is maximal.
15. The method of claim 14, wherein the reaction chemical includes at least one of acid, caustic, flocculating agent, precipitating agent, nucleating agent, or sequestering agent.
16. The method of claim 1, further comprising removing solids from the wastewater stream by holding the wastewater in a tank where solids are separated from the wastewater, filtering suspended solids by directing the flow of the wastewater through at least one filter, or removing dissolved compounds by directing the flow of the wastewater through an ion absorption bed.
17. The method of claim 16, wherein removing solids from the wastewater stream includes holding the wastewater in the tank where solids are separated from the wastewater, removing a slurry that includes the solids from the tank, and de-watering the slurry.
18. The method of claim 17, wherein de-watering the slurry includes de-watering the slurry to provide a dewatered material, wherein 10 to 50 percent of the dewatered material is water.

19. The method of claim 17, wherein holding the wastewater in the tank includes holding a given volume of the wastewater in the tank for 20 to 100 minutes.

20. The method of claim 1, further comprising removing dissolved compounds by directing the flow of the wastewater through an ion absorption bed with the ion absorption bed containing between 1 and 20 liters of media per liter per minute (lpm) of flow rate of the wastewater through the ion absorption bed.

21. The method of claim 1, wherein exposing the wastewater stream to sonic energy includes controlling pressure of the wastewater during exposure of the wastewater to sonic energy to be 30 to 40 pounds per square inch (psi).

22. The method of claim 1, wherein exposing the wastewater stream to sonic energy includes controlling a flow rate of the wastewater during exposure of the wastewater to sonic energy to be 0.5 to 2 gallons per minute (gpm).

23. The method of claim 1, wherein the sonic energy has a frequency of 18 to 40 kilohertz.

24. The method of claim 1, wherein the sonic energy has a frequency of 20 kilohertz.

25. The method of claim 1, wherein the sonic energy has a power of 900 watts.

26. The method of claim 1, wherein exposing the wastewater stream to sonic energy includes exposing a given volume of the wastewater to sonic energy for 0.2 to 10 seconds.

27. The method of claim 1, wherein exposing the wastewater stream to sonic energy includes exposing a given volume of the wastewater to sonic energy for 0.2 to 4 seconds.

28. The method of claim 1, wherein exposing the wastewater stream to sonic energy includes exposing a given volume of the wastewater to sonic energy for 0.5 to 2.5 seconds.

29. The method of claim 1, wherein exposing the wastewater stream to sonic energy includes exposing the wastewater to sonic energy at 0.1 to 10 watt-hours per liter of wastewater to be treated.

30. The method of claim 1, wherein adding the precipitating agent includes controlling a dosage of the precipitating agent to be 50 to 500 parts per million (ppm).

31. The method of claim 1, further comprising adding a flocculating agent to the wastewater stream, wherein adding the flocculating agent includes controlling a dosage of the flocculating agent to be 10 to 100 parts per million (ppm).

32. The method of claim 1, further comprising:
adding a flocculating agent to the wastewater stream; and
adding a nucleating agent to the wastewater stream, wherein adding the nucleating agent and adding the flocculating agent, in combination, adds less than 0.1 percent solids.

33. The method of claim 1, further comprising polishing the wastewater stream by exposing the stream to at least one absorbent, wherein the absorbent includes between 1 and 20 liters of media per liter per minute (lpm) of flow rate of the wastewater through the absorbent.

34. The method of claim 1, wherein exposing the wastewater stream to sonic energy includes directing the flow of the wastewater through a sonication chamber in which the sonic energy is applied to the wastewater, wherein the sonication chamber creates a rotating spiral flow of the wastewater.

35. The method of claim 34, wherein the rotating spiral flow of the wastewater moves the wastewater upward from an inlet port in the sonication chamber to an outlet port disposed above the inlet port in the sonication chamber.

36. A method for treatment of a wastewater stream containing dissolved compounds or ions, the method comprising:
exposing the wastewater stream to sonic energy by directing flow of said wastewater stream through a sonication device;
adding a nucleating agent to the wastewater stream before the wastewater stream is exposed to sonic energy;
adding an oxidizing agent to the wastewater stream before the wastewater stream is exposed to sonic energy;
removing solids from the wastewater stream by holding the wastewater in a tank where the solids can settle or directing the flow of the wastewater stream through at least one filter; and
polishing the wastewater stream by exposing the stream to at least one adsorbent.

37. The method of claim 36, further comprising adding a precipitating agent to the wastewater stream before the wastewater stream is exposed to sonic energy.

\* \* \* \* \*